(12) United States Patent
Roetling

(10) Patent No.: US 6,349,146 B2
(45) Date of Patent: *Feb. 19, 2002

(54) DEVICE-BIASED COLOR CONVERTING APPARATUS AND METHOD

(75) Inventor: Paul G. Roetling, Webster, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,090

(22) Filed: Dec. 22, 1998

(51) Int. Cl.$^7$ .................................................. G06K 9/00
(52) U.S. Cl. ....................................... 382/162; 382/165
(58) Field of Search ................................ 382/162, 163, 382/164, 165, 166, 167, 168, 169, 170, 171, 172, 173; 358/518–523; 345/150–155, 431, 430

(56) References Cited

U.S. PATENT DOCUMENTS

| | | | | |
|---|---|---|---|---|
| 5,572,632 A | * | 11/1996 | Laumeyer et al. | 395/116 |
| 5,596,428 A | * | 1/1997 | Tytgat et al. | 358/518 |
| 5,982,318 A | * | 11/1999 | Yiannoulos | 341/155 |
| 6,023,527 A | * | 2/2000 | Narahara | 382/167 |
| 6,088,038 A | * | 7/2000 | Edge et al. | 345/431 |

* cited by examiner

Primary Examiner—Phuoc Tran
Assistant Examiner—Amir Alavi
(74) Attorney, Agent, or Firm—Oliff & Berridge, PLC

(57) ABSTRACT

An apparatus and methods that convert input image data into device-biased image data useable with one or more image output devices such that the device-biased image data may be easily converted into device-specific image data while still being in a form that is able to be converted back into the original image data. The apparatus and methods perform device-biased color space adjustment operations on the image data input by an image data source. The apparatus and methods convert the input image data into device-biased image data according to one or more conversion methods and stores the device-biased image data. The device-biased image data is then converted into device-specific image data whenever the image is to be output by an image output device.

25 Claims, 10 Drawing Sheets

DEVICE-BIASED COLOR CONVERTING APPARATUS AND METHOD

BACKGROUND OF THE INVENTION

1. Field of Invention

This invention is directed to apparatus and methods that convert input image data into device-biased image data for use with one or more image output devices.

2. Description of Related Art

When a user creates a document or image having, for example, a plurality of colors, the colors each have values associated with them in order to categorize the color in such a way that the color may be reproduced. For example, with a cathode ray tube (CRT) device, computer monitor, and other such similar display devices, the colors of individual pixels are identified in terms of the red (R), green (G) and blue (B) components of the color to be displayed for the pixel. For devices that provide hard copy images, such as for example, printers, photocopiers, and the like, the colors that are output are identified by their cyan (C), magenta (M), yellow (Y) and black (K) components.

To make it convenient to handle many different input and output devices, it is becoming more common to describe the colors in a "device-neutral" (also called device-independent) color space. This color space essentially describes how the color is seen by the eye and typically uses color spaces originally standardized by the CIE in their 1931 or later standards. In recent standards by the International Color Consortium, these spaces are also referred to as Profile Connection Spaces (PCS), where the profiles describe how given device color descriptions are transformed into (or from) the PCS. The device-neutral space referred to in the following as the exemplary space is L*a*b*, defined by CIE, where L* is the lightness and a* and b* are color differences from gray (roughly described as red-green and blue-yellow). In general, conversions to/from these spaces require multi-dimensional conversions, usually done in computers by three or four dimensional lookup tables (LUTs).

When an image is to be output by an image output device, the image typically must be converted from device-neutral image data, such as L*a*b*, to device-specific image data, such as cyan (C), magenta (M), yellow (Y) and black (K), for the particular output device. Alternatively, if the original data is specific to the input device, then calibration data is needed and the equivalent of the transformation from input device to device-neutral to output device-specific output is done as one very complicated transformation. In either case, this resulting device-specific image data is stored as the image data for the image. Storing device-specific image data as the image data for the image decreases the processing time necessary for processing the image data when the image is to be output because the image data is already in a form useable by the image output device. However, the conversion from device-neutral image data to device-specific image data is irreversible.

One reason that the conversion is irreversible is that not all devices are capable of displaying or printing the same color values. The image output device outputs the image using device-specific image data which has been obtained from device-neutral image data. During the conversion from device-neutral image data to device-specific image data, because not all color values in the device-neutral image data color space can be accurately represented in the device-specific image data color space, some color values are lost during the conversion. This is due to limiting the ranges of color values to convert them into color values that are within the gamut of the image output device. Thus, since the original color values have been lost during the conversion, a reverse conversion is not capable of recapturing these color values.

One way to overcome this problem is to store the image data as device-neutral image data and to perform the conversion into device-specific image data whenever the image is to be output by an image output device. However, because the conversion is complex, the computing time to effect the conversion is great. Thus, the processing time necessary to process the image data for output is greatly increased. This method is acceptable, even preferable, when the data are output to different devices each time output is desired, but it is much less desirable when the data may be output numerous times on the same, or very similar, devices. It is the latter case which causes people to resort to the time-saving method of saving device-specific data forms, with the result that information has been lost and the best reproduction can no longer be achieved on any other output device.

Another way to overcome the above problem in the prior art is to store the image as both device-neutral and device-specific image data. However, this effectively doubles the amount of memory needed to store the image. Furthermore, if more than one type of image output device is being utilized, multiple versions of the device-specific image data may be necessary and would thus, increase the memory requirements even more. Therefore, maintaining the image as both device-neutral and device-specific image data is not a practical solution.

SUMMARY OF THE INVENTION

This invention provides a solution to the problem of desiring a method of storing image data such that a given (or similar) output device can quickly and easily output the data, such as for numerous reprintings, yet maintaining the capability to perform a complete and accurate reverse transformation to the original device-neutral data, to enable a full quality output to a completely different output device. The method provides solutions which require much less storage space than the previously known method of keeping both the device-neutral and device-specific forms.

This invention provides apparatus and methods for providing "device-biased" image data for use with one (or similar) image output devices. The device-biased image data has the properties that (1) it may be easily converted into device-specific image data, without any multi-dimensional transformations, and (2) it contains unique descriptions of all original colors, such that an accurate reverse transformation to the original device-independent form is possible.

The apparatus according to this invention may be incorporated into an image processing system that includes an image data source, a device-biased image data converter and an image output device. The device-biased image data converter performs device-biased color space adjustment operations on the image data input by the image data source. The device-biased image data converter converts the input image data into device-biased image data according to one or more conversion methods and stores the device-biased image data in memory in place of the input image data. The device-biased image data may then be converted into device-specific image data whenever the image is to be output by an image output device.

Because the image data is stored as device-biased image data, large multidimensional look-up tables are not required to convert from the device-biased image data to device-specific image data. Rather, for example, one dimensional look-up tables may be used to convert device-biased image data to device-specific image data. This is because the image data has already been mostly converted into device-specific image data by converting the image data into device-biased image data. Thus, with the use of the device-biased image data converter, image data may be stored in a device-biased color space which is able to be quickly converted to device-specific image data without requiring large amounts of processing time or memory space and is also capable of being fully restored to the original, device-neutral, form.

BRIEF DESCRIPTION OF THE DRAWINGS

Exemplary embodiments of the apparatus and methods of this invention will be described with reference to the following figures, wherein like numerals designate like elements, and wherein.

DETAILED DESCRIPTION OF PREFERRED EMBODIMENTS

Figure 1:
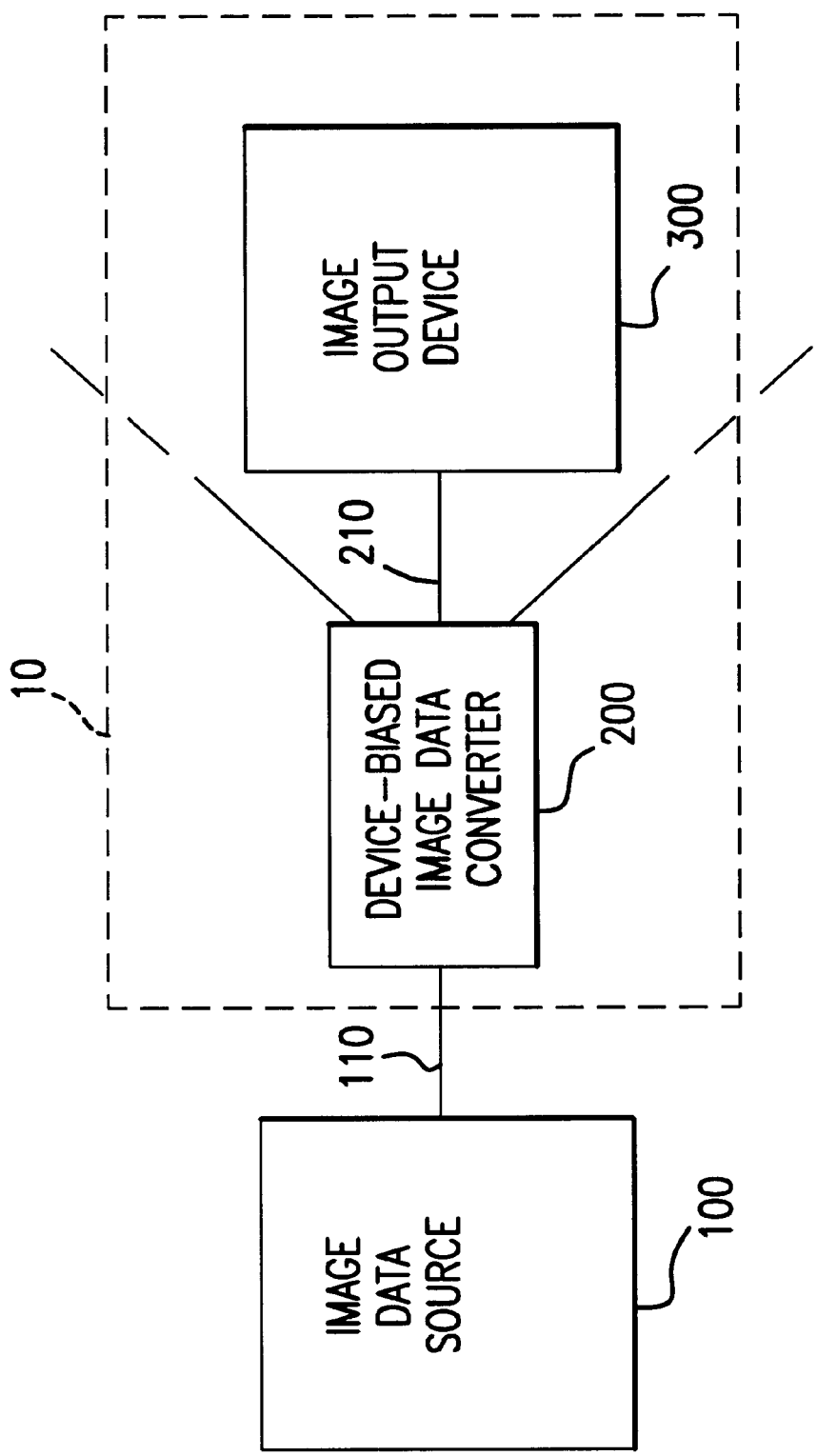
FIG. 1 is a functional block diagram of one exemplary embodiment of an image output system according to this invention.

FIG. 1 shows a functional block diagram of one exemplary embodiment of an image output system 10 according to this invention. As shown in FIG. 1, the image output system 10 is connected to an image data source 100, and includes a device-biased image data converter 200 and an image output device 300. These devices are coupled together via data communication links 110 and 210. These communication links 110 and 210 may be any type of communication link that permits the transmission of data. For example, the communication links may be direct serial connections, a local area network (LAN), a wide area network (WAN), an intranet, the Internet, circuit wirings, and the like.

The image data source 100 is any type of device that is capable of supplying image data. For example, the image data source 100 may be a personal computer, a microprocessor, a scanner, a disk drive, a tape drive, a hard disk, zip drive, CD-ROM drive, DVD drive, a network server, a print server, photocopying device or any other known or later developed device or system that is able to provide image data. The image data source 100 may include a plurality of components including displays, user interfaces, memory, disk drives, and the like. For simplicity of the following disclosure, it will be assumed that the image data source 100 is a personal computer.

The image output device 300 is any type of device that is capable of outputting an image. For example, the image output device 300 may be a laser printer, bubble jet printer, ink jet printer, photocopying machine, cathode ray tube (CRT), computer monitor, television or any other known or later developed device or system that is able to generate an image on a recording medium or display an image using image data or data generated from the image data. The image output device 300 generates an image based on device-specific image data from the device-biased image data converter 200. While FIG. 1 shows a single image output device 300, multiple image output devices 300 may be coupled to the device-biased image data converter 200.

While FIG. 1 shows the device-biased image data converter 200 as a separate device from the image output device 300, the device-biased image data converter 200 may be an integrated device, such as a digital copier, a computer with a built-in printer, or any other integrated device that is capable of outputting an image. With such a configuration, for example, the device-biased image data converter 200 and the image output device 300 may be contained within a single device.

Alternatively, the device-biased image data converter 200 may be a separate device attachable upstream of a stand-alone image output device 300. For example, the device-biased image data converter 200 may be a device which interfaces with both the image data source 100 and one or more image output devices 300. For example, the device-biased image data converter 200 may be incorporated into a network print server that manages printer data for a plurality of the same or different printer devices. If the device-biased image data converter 200 is a separate device from the image output device 300, information pertaining to the device-specific image data type for each image output device 300 may be stored in a memory of the device-biased image data converter 200. The information stored in memory may then be used to identify the device-specific image data to which the device-biased image data should be converted when using the image output device 300 to output the image.

Furthermore, the device-biased image data converter 200 may be implemented as software on the image data source 100 or the image output device 300. Other configurations of the elements shown in FIG. 1 may be used without departing from the spirit and scope of this invention.

The term "image," as used in this disclosure, refers to any image containing any or all of: one or more halftone, continuous tone and/or line art graphics and/or any compilation of text that is capable of being displayed on a display device or as a hard copy. For example, an image may be a combination of graphics and text that is stored in the image data source 100 as a series of pixel values denoting the color, intensity, and/or any other known or later developed image property of the particular pixels that make up the image.

The image data source 100 provides an image as image data that, when used to display the image or convert the image into a hard copy, provides an approximate representation of the image. The image data source 100 provides the image data to the device-biased image data converter 200.

The image data input from the image data source 100 to the device-biased image data converter 200 may be in either a device-specific or device-neutral color space. For example, if the image data source 100 is a personal computer, the image data used for representing the image are typically in the RGB color space since this is the color space used by the display device of the computer. These RGB image data values may be directly forwarded to the device-biased image data converter 200 or may undergo conversion into a device-neutral color space, such as L*a*b*, prior to being input to the device-biased image data converter 200. If RGB data is sent, then device calibration data either needs to be sent with it or previously stored at the converter. As the conversion of RGB data to device-neutral data, using calibration data, is known in the art, we assume in further discussion that the input source provides device-neutral data.

Methods for converting device-specific color space image data values into device-neutral color space image data values are readily known to those of ordinary skill in the art. Any known or later developed method may be used without departing from the spirit and scope of this invention.

The use of device-neutral image data is preferred because device-neutral image data provides a consistent representation of the image regardless of the image output devices used to output the image. The device-neutral image data represents the image as it would be perceived by the human eye. Although device-neutral image data is preferred, the apparatus and methods of this invention are not limited to the use of device-neutral image data. Thus, any device-specific image data, such as RGB, CMYK, and the like, may be used without departing from the spirit and scope of this invention. In any case, the device-biased image data converter 200 performs device-biased color space adjustment operations on the image data input by the image data source 100. For purposes of the following description of the exemplary embodiments of the apparatus and methods of this invention, it will be assumed that the image data supplied to the device-biased image data converter 200 is device-neutral image data.

The device-biased image data converter 200 receives the device-neutral image data of the image to be reproduced. For example, the device-neutral image data may be image data in the L*a*b* color space. The device-neutral image data is temporarily stored in a memory of the device-biased image data converter 200.

The device-biased image data converter 200 converts the device-neutral image data into device-biased image data. The device-biased image data converter 200 may store the device-biased image data in memory in place of the device-neutral image data from the memory in order to conserve storage space. Alternatively, the device-biased image data may be stored for re-use at later times, such as for later reprint of the same image (or document). Now, or at a later time, the device-biased image data is converted into device-specific image data, whenever the image is to be output by the chosen (or similar) image output device. Thus, as noted earlier, this invention assures that the data can quickly and easily be output to the chosen device, as often as needed, while assuring that the data is in a form that is fully reversible to original (device-neutral) form, if it is ever desired to output to a completely different device.

For example, if the image output device 300 is a printer, the color space used by the printer will often be in the CMYK color space. The printer will have a gamut of the CYMK colors that the printer is capable of reproducing. Thus, when the printer is used to reproduce the image, the device-biased image data converter 200 will convert the device-biased image data into device-specific image data in the CMYK color space based on the gamut of the printer.

Because the image data is stored as device-biased image data, large multidimensional look-up tables are not required to convert the device-biased image data to device-specific image data in real time. Rather, for example, one dimensional look-up tables may be used to convert device-biased image data to device-specific image data in real time. This is because the image data has already been mostly converted into device-specific image data by converting the device-neutral image data into device-biased image data.

Additionally, because the device-biased image data is not limited to the particular gamut of the image output device 300, the device-biased image data may be converted back into the device-neutral image data so that the original input image data values may be recovered. Thus, by using the device-biased image data converter 200, image data may be stored in a device-biased color space that can be simply converted (without requiring large amounts of processing time or memory space) to device-specific image data and can also be converted back into the original input image data.

Figure 2:
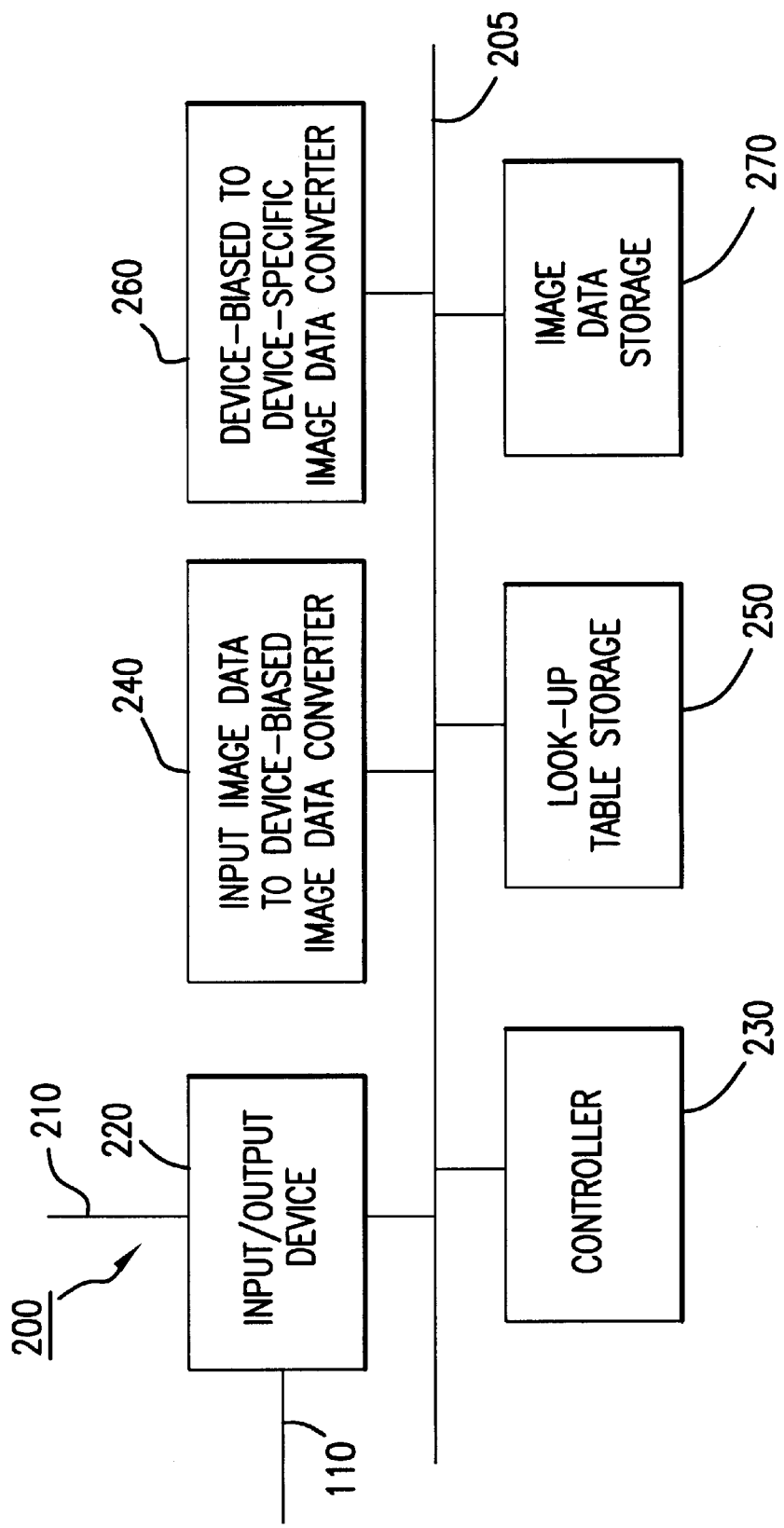
FIG. 2 is an exemplary functional block diagram of the device-biased image data converter of FIG. 1.

FIG. 2 is a functional block diagram showing in greater detail one exemplary embodiment of the device-biased image data converter 200. As shown in FIG. 2, the device-biased image data converter 200 includes an input/output interface 220, a controller 230, an input image data to device-biased image data converter 240, a look-up table storage 250, a device-biased to device-specific image data converter 260 and an image data memory 270. The elements of the device-biased image data converter 200 communicate with one another over a data and/or control bus 205 under the control of controller 230. Although FIG. 2 shows the components of the device-biased image data converter 200 being connected via the bus 205, other configurations and devices may be used to facilitate communication between the components without departing from the spirit and scope of this invention. Similarly, while FIG. 2 shows the image data source 100 and image output device 300 being connected to the device-biased image data converter 200 via the links 110 and 210 and the input/output interface 220, other configurations and devices may be used to facilitate communication between the device-biased image data converter 200 and the image data source 100 and the image output device 300 without departing from the spirit and scope of this invention.

The device-biased image data converter 200 receives the image data from the image data source 100 over communication link 110 via the input/output interface 220 and temporarily stores the image data in the image data memory 270. As indicated above, it has been assumed, for the purposes of this description, that the image data received from the image data source 100 is device-neutral image data. However, if the image data is not device-neutral image data, the controller 230 may convert the image data into device-neutral image data or an additional converting device may be added to the device-neutral image data converter 200 shown in FIG. 2 to perform this function.

The controller 230 then instructs the input image data to device-biased image data converter 240 to convert the device-neutral image data into device-biased image data. These methods may make use of the look-up tables stored in the look-up table memory 250. The device-biased image data is then stored in the image data memory 270 to be used later when outputting the image.

The device-biased image data may be transmitted to the image data source 100, or elsewhere, and for later use when outputting the image. In this case, when outputting the image, the device-biased image data converter 200 would not perform a second conversion of the device-biased image data received from the image data source 100 because the image data is already device-biased image data.

When a command is provided, for example, from the image data source 100, to the device-neutral image data converter 200 to output the image data to the image output device 300, the controller 230 instructs the device-biased to device-specific image data converter 260 to convert the device-biased image data for the image, stored in the image data memory 270, into device-specific image data. This may be accomplished, for example, by gamut mapping the device-biased image data values to device-specific image data values within the gamut of the specific image output device 300 that is to output the image. The device-specific image data is then supplied to the image output device 300 via the input/output interface 220 and communication link 210.

For purposes of the following description, it is assumed that the image data source 100 provides image data in a device-neutral color space L*a*b* and the image output device 300 receives as input, image data in the CMYK color space. Although these color spaces are chosen for purposes of description, other color spaces may be used without departing from the spirit and scope of this invention.

When the device-biased image data converter 200 receives image data from the image data source 100, the image data is converted from the device-neutral color space image data, L*a*b*, to device-biased image data. This is done by mapping the device-neutral color space image data to image data of a color space useable by the image output device 300. For in-gamut device-neutral image data, the mapping method is known in the art and is performed in a known manner. However, for out-of-gamut device-neutral image data, conventional mapping does not provide a reversible result.

One way in which the mapping of out-of-gamut device-neutral image data according to this invention may be accomplished is by mapping the L*a*b* color values to CMYK values regardless of the gamut of the image output device 300. This results in a larger range of CMYK values than can be printed, but this larger range can be stored as device-biased image data color values. Thus, the device-biased image data color values may not be able to be output by the image output device 300. However, a simple clipping technique may be used to clip each component of the device-biased image data color values to image output data values that are within the gamut of the image output device 300. Likewise, since the results of the mapping are stored in memory as device-biased image data color values, the mapping may be reversed to obtain the original L*a*b* color values. This method works well when colors are not too far out of gamut. Techniques are described below for mapping colors that are further out of gamut.

For example, assume that the values of in-gamut CMYK values range from 0.0 to 1.0, 0.0 being no color and 1.0 being the maximum amount of color the image output device 300 can provide. Suppose a particular out-of-gamut L*a*b* color value of the input image data maps to a CMYK value having a C value that is 1.5. A simple, conventional gamut mapping technique would clip the value to the maximum value that may be output by the image output device 300 and would store this value as the image data. However, by doing so, the clipped value cannot be used to determine the original L*a*b* value because the clipped value would reverse map to a different L*a*b* value than the original. This is because multiple input color values may map to the same in-gamut color value.

With the apparatus and methods according to this invention, the actual cyan value of 1.5 is stored in memory as the device-biased image data. Thus, the input image data to device-biased image data converter 240 converts the L*a*b* color value into a CMYK color value having a cyan value component of 1.5 and stores this value in the image data storage 270 as device-biased image data. The device-biased to device-specific image data converter 260 then converts this device-biased image data into device-specific image data using, for example, a one-dimensional look-up table for each color component that maps the device-biased image data to a corresponding in-gamut image data color value or using a clipping technique to clip the image data color values to in-gamut color values.

Alternatively, a second technique for mapping of out-of-gamut device-neutral image data may be performed by first determining, for each L*a*b* image data color value, the desired in-gamut CMYK value that the L*a*b* image data should be mapped to for outputting the image. As before, there are various, advanced gamut mapping methods known in the art, any of which can be used here to determine the preferred color mappings. Then, according to this invention, for out-of-gamut colors, a C'M'Y'K' value is assigned to the out-of-gamut L*a*b* image data color value such that when each component C', M', Y' and K', of the out-of-gamut C'M'Y'K' color value is clipped, or otherwise converted, to the gamut of the image output device 300, the desired in-gamut CMYK value is obtained.

Figure 3:
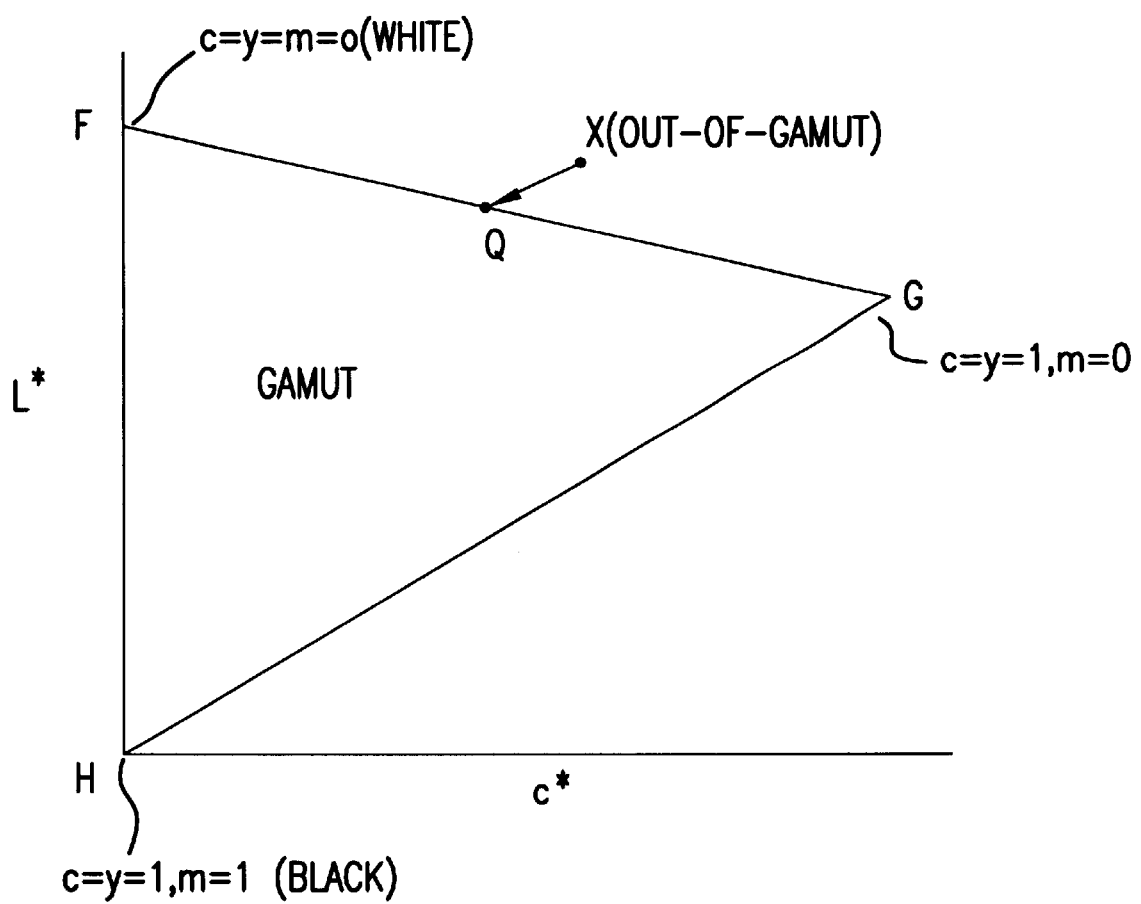
FIG. 3 is an exemplary gamut leaf plot outlining one exemplary image data conversion according to one embodiment of the apparatus and methods of this invention.

An example of this mapping is shown in FIG. 3. FIG. 3 shows an exemplary leaf of a three dimensional L*a*b* plot (The c* plotted is the conventional term, equalling the square root of $a^{*2}+b^{*2}$). The triangle made by the lines extending between points F, G and H represents the output gamut for this hue, such as, for example, green. As shown in FIG. 3, the desired mapping of the out-of-gamut L*a*b* color X is to the color represented by point Q where C=Y<1 and M=0. Rather than having a complex mapping scheme to map the actual L*a*b* color X to the point Q, an out-of-gamut C'M'Y'K' color value is chosen such that when each component of the C'M'Y'K' color value is clipped or otherwise converted, the desired image output color CMYK is obtained. In this way, each out-of-gamut color is assigned a unique out-of-gamut color value that produces the desired in-gamut color value when clipped or otherwise converted.

Thus, using the above example, assume that the out-of-gamut L*a*b* color value maps to a desired CMYK color value having a cyan (C) component of 0.7, a magenta (M) component of 0.0, a yellow (Y) component of 0.7 and a (K) component of 0.0. (The K component is 0.0 in this example because black (K) is only used to replace some of CMY for darker colors, whereas this color is lighter than can be printed). Thus, in order to obtain the desired CMYK color value, the C'M'Y' color value to which the L*a*b* color value is mapped may be chosen to be C=0.7, M=−0.6, Y=0.7 or the like. The choosing of particular mapped color values may be arbitrary or may be based on a devised relationship. If chosen arbitrarily, the restriction is that, when each color component is clipped to the range of the device gamut, the resulting values must equal the correct device-specific values.

The effect of the above mapping is that every desired CMYK color value may be mapped to a chosen C'M'Y'K' color value, or device-biased image data color value, which may then be mapped to the input L*a*b* color values. Thus, the C'M'Y'K' color values may be used to map to both the device-neutral and device-specific color spaces.

As described above, choosing device-biased color space values may be arbitrary or may be based on a devised relationship between the chosen values and one or both of the device-neutral or device-specific color space values. In either case, the following criteria should be adhered to in order to insure proper mapping for out-of-gamut colors:

(1) at least one of the color components of the device-biased color value C'M'Y'K' should be outside the gamut of the image output device;

(2) color component values that are to be clipped or otherwise converted to 0.0 should be negative and those to be clipped to 1.0 should be greater than 1.0; and (3) the device-biased color value C'M'Y'K' should be unique for each different input color.

Figure 4:
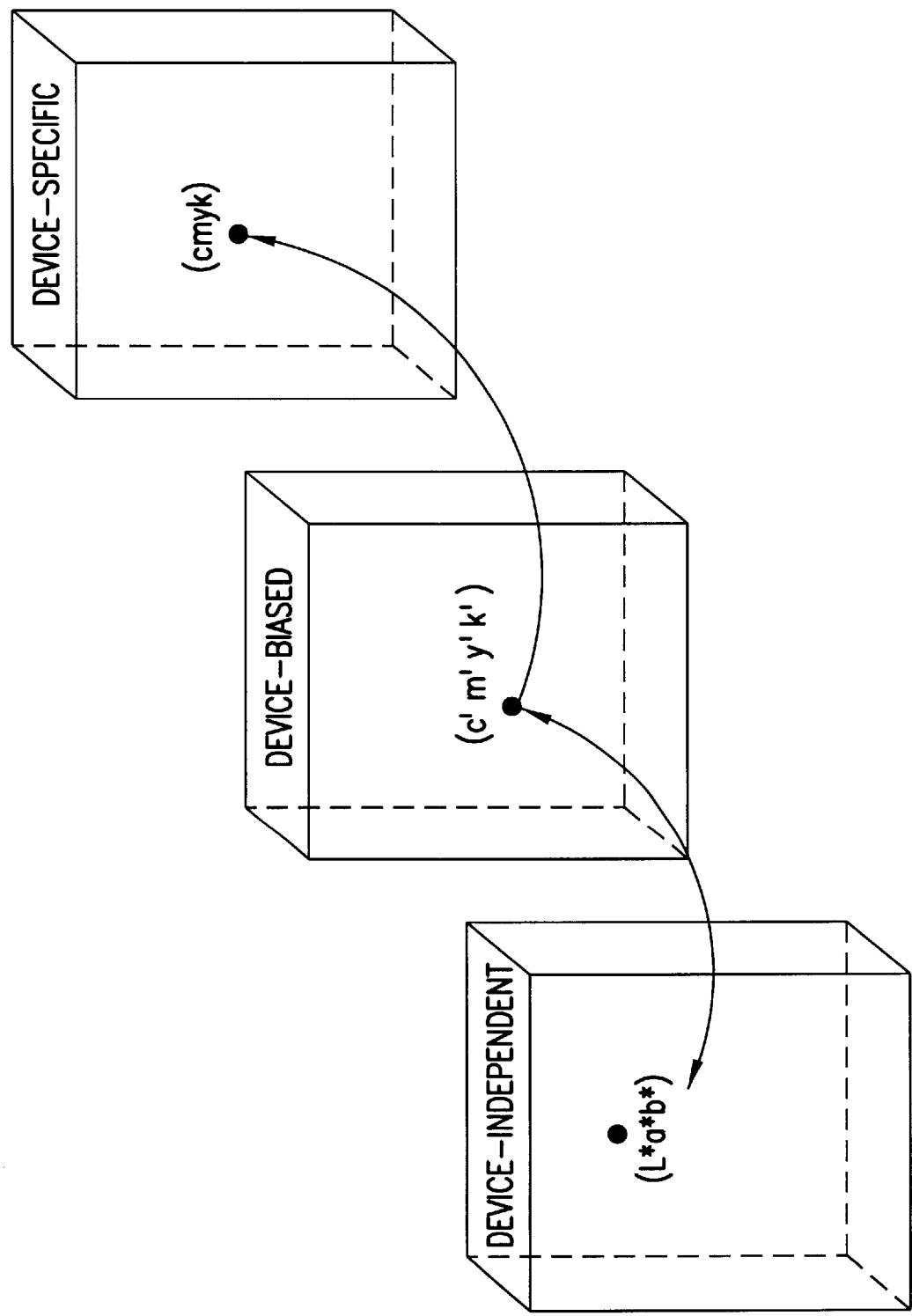
FIG. 4 is a conceptual diagram of the conversion from device-neutral to device-specific image data.

FIG. 4 conceptually diagrams converting device-neutral image data to device-biased image data to device-specific image data according to the methods according to this invention. As shown in FIG. 4, the device-biased mapping is performed by choosing a set of unique color values C'M'Y'K', which, when gamut mapped to the device-specific color space, produce a desired color output. Thus, the device-neutral image data L*a*b* is converted into device-biased image data using the chosen mapping color values C'M'Y'K'. The device-biased image data is converted into device-specific image data CMYK using the conventional clipping techniques on each color component.

The second technique described above works well for uncomplicated images having a minimal number of out-of-gamut color values. For complicated gamut mapping, such as when a photograph having many different out-of-gamut color values is being reproduced by an image output device, another technique may be used to reduce the size of the look-up tables used during the mapping. This technique is similar to the second technique, except that the mapped color values are not arbitrarily chosen.

To simplify this example, it should be noted that the black component (K) values are generated as part of the gamut mapping algorithm (or immediately after it, in some cases). Thus, because the output device is known at the time of calculating K, no out-of-gamut K value is ever created. Thus, for simplicity, K is omitted from the example. It should be noted, however, that the CMYK values that limit the gamut might be less than the full 0 to 1 range (for example, most printers cannot print 100% of all colorants together, so black is not C=M=Y=K=1). In the example, we use 1.0 as if it were the full printable range, but it must be realized that this means the maximum which can be printed, not necessarily the full value that could be printed if only one component were used. With this realization, we can describe the system as if it were three color components; but it must be realized that the K component is present.

For a given color to be out-of-gamut, it must be either above, below or at a greater c* than the gamut of the output device. It will be mapped, by the chosen gamut mapping method to the top, bottom or greatest c* point of the gamut (or within the gamut) for some hue (shown by the leaf chosen). The example given shows a color mapped to the top of the gamut. Parenthetical notes give differences if the color is mapped to the bottom, and either method can be applied for the mapping to the endpoint.

Figure 5:
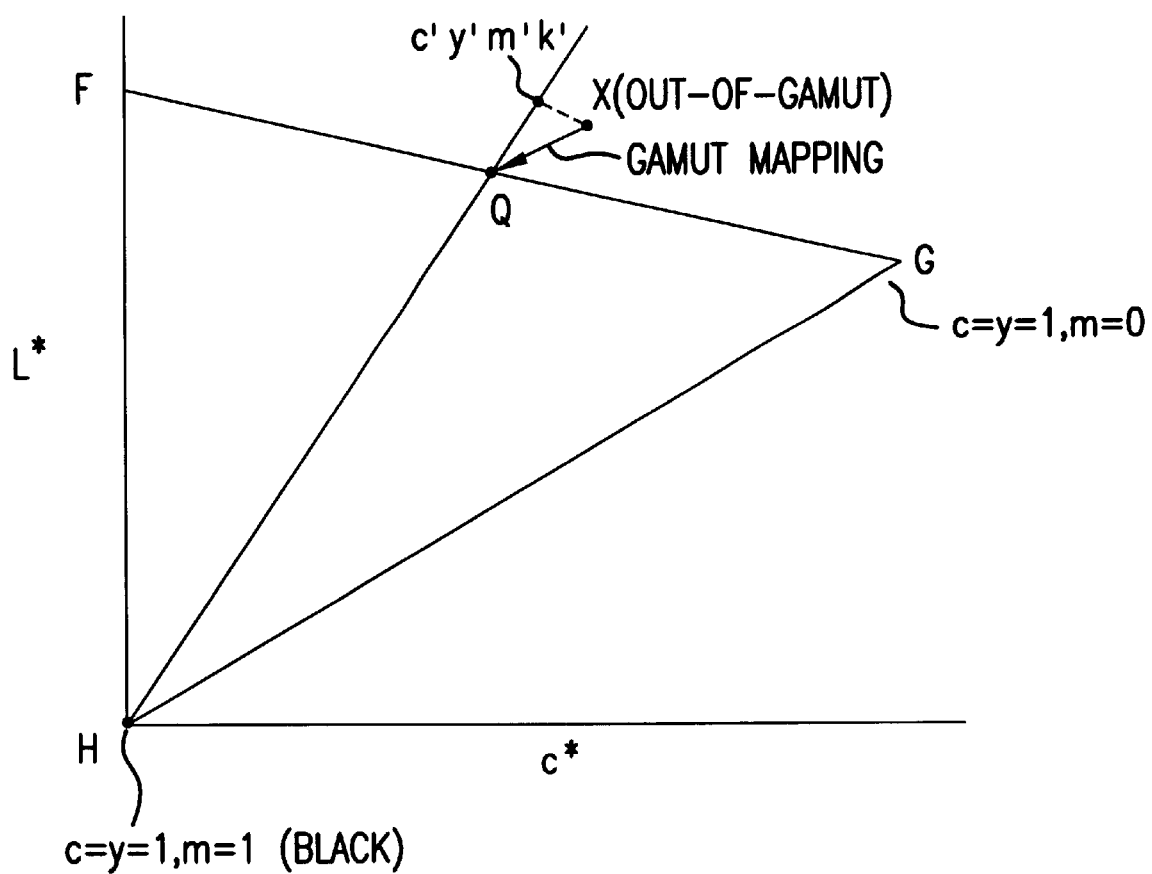
FIG. 5 is an exemplary gamut leaf plot outlining one exemplary image data conversion according to another embodiment of the apparatus and methods of this invention.

FIG. 5 is an exemplary leaf of a three dimensional L*a*b* plot similar to that of FIG. 3. As shown in FIG. 5, the color X is an out-of-gamut color lying outside the gamut of the image output device represented by the triangle connecting points F, G and H. Q represents the desired color to which X should be mapped. The line L is drawn from the origin H through point Q and extends out of the gamut (For points on the bottom, L is drawn from F through the corresponding color Q). Points along the line L have increasing amounts of C, M and Y as they approach the origin H until they all equal 1.0 at origin H (representing the color black). (For bottom points, increasing becomes decreasing, reaching 0.0 at white.) Thus, the line extended outside the gamut represents colors that would require negative amounts of magenta (M). (Or greater than 1.0 M values for the color mapped up to the bottom of the gamut.)

At the point of closest approach to the color X along line L, there is an extrapolated negative magenta (M) value that can be assigned to the out-of-gamut color X (or >1 for the bottom case). Thus, the out-of-gamut color X may be assigned the in-gamut mapped values of C and Y and the extrapolated negative (or >1 for the bottom case) value of M. When these values are converted into device-specific image data, the C and Y values are mapped to their respective in-gamut values and the negative value of M is clipped to the minimum value for the gamut of the image output device 300. Note that if the gamut mapping actually maps to slightly within the gamut, then the simple LUTs must be used instead of sharp clipping; otherwise the method is the same.

Because all practical gamut mapping methods use smooth algorithms, nearby input color values are mapped to nearby output color values. Therefore, this technique will assign nearby out-of-gamut color values to nearby input color values. This allows a look-up table for out-of-gamut color conversion from the device biased color values back to the input color values to be a sparse set of nodes with interpolation used to find values for each specific color, thus conserving storage space for the fill data set.

The above described device-biased image data converter 200 may make use of any combination of the above three techniques for converting the device-neutral image data into device-biased image data. These techniques may be implemented using hardware, software or a combination of hardware and software. For speed reasons, the clipping or 1 dimensional LUTs for conversion to device-specific output, will often be in hardware because it is simple to implement. The multi-dimensional conversions to/from device-neutral forms will usually be implemented in software, except in expensive systems.

Figure 6:
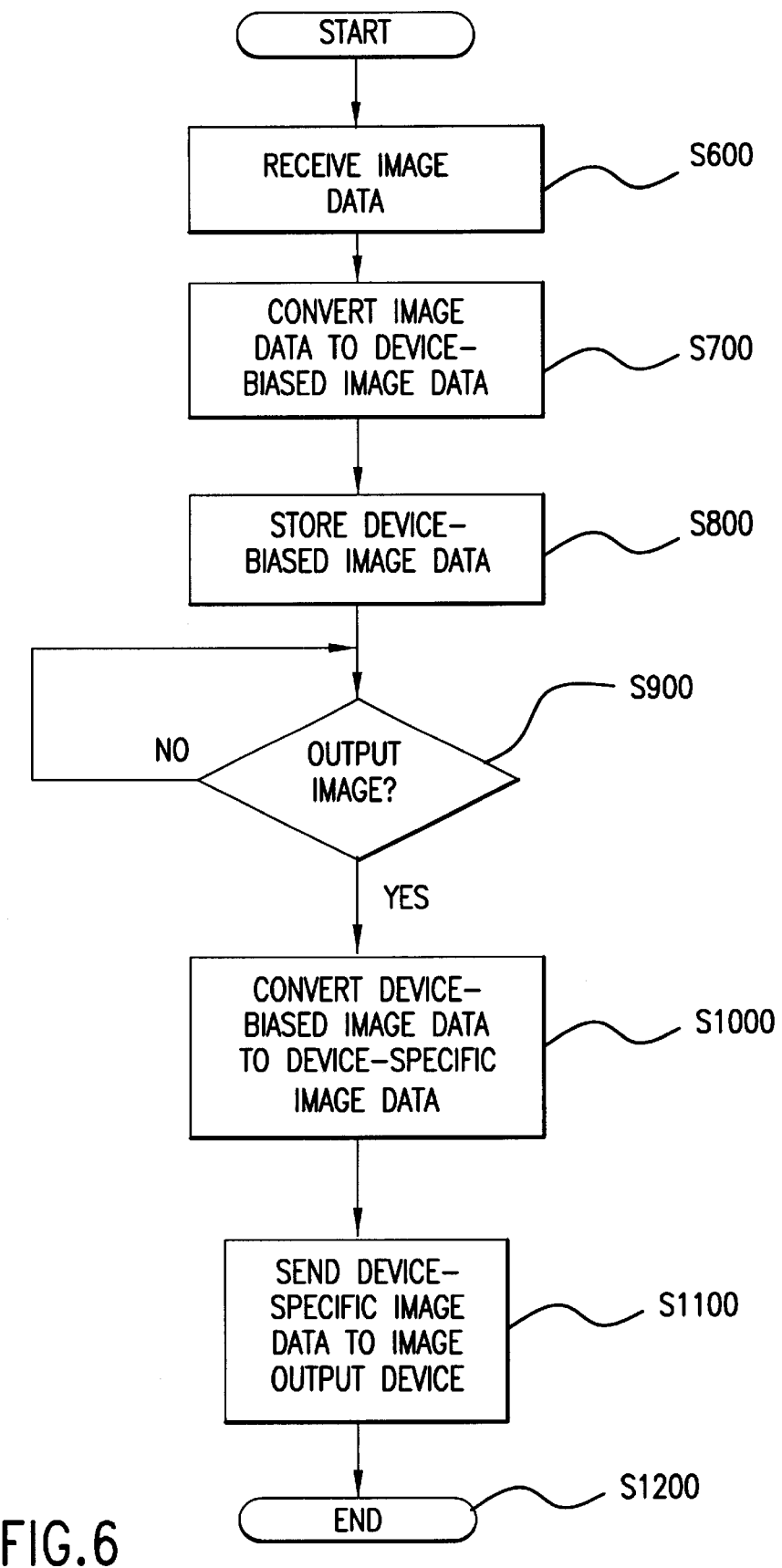
FIG. 6 is an exemplary flowchart outlining one embodiment of an image data conversion method according to this invention.

FIG. 6 is an exemplary flowchart of one embodiment of this invention. In step S600, the image data is received and stored in memory. Next, in step S700, the image data is converted to device-biased image data according to one of the techniques described above. Then, in step S800, the device-biased image data is stored in memory. As noted previously, this device-biased data may also be stored elsewhere for future use for reprinting, archiving, etc.

Next, in step S900, a determination is made whether the device-biased image data is to be output to an image output device. If not, control returns to step S900. Otherwise, if the output image is to be formed, control continues to step S1000.

In step S1000, the device-biased image data is converted into device-specific image data for the image output device that is to output the image. Then, in step S1100, the device-specific image data is output to the image output device. Then, in step S1200, the conversion method ends.

As described above, step S700 may comprise one or more of the three techniques for converting image data to device-biased image data. Additionally, other techniques for converting image data to device-biased image data may be used without departing from the spirit and scope of the apparatus and methods according to this invention, so long as the device-biased image data is able to be converted to either one of device-specific image data or converted back into the original image data.

Figure 7:
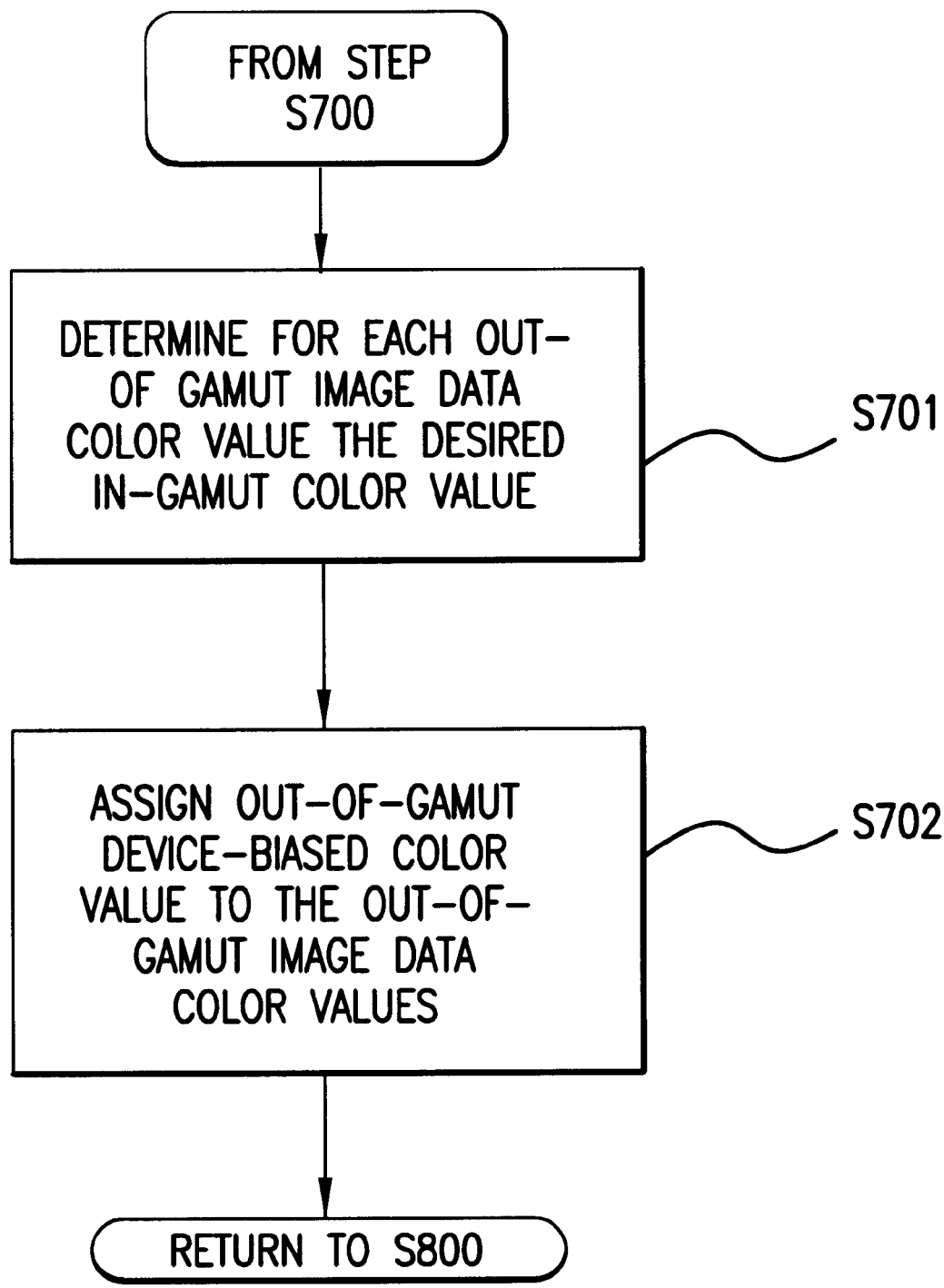
FIG. 7 is an exemplary flowchart outlining one exemplary embodiment of the device-independent to device-biased image data conversion step according to this invention.

FIG. 7 is a flowchart outlining one exemplary embodiment of the image data to device-biased image data conversion step S700 of FIG. 6. Starting in step S700, control continues to step S701, where the desired in-gamut color values for the out-of-gamut image data color values are determined. Next, in step S702, unique out-of-gamut device-biased color values are assigned to the out-of-gamut image data color values. Then, in step S703, control then returns to step S800.

As described above, the unique out-of-gamut device-biased color values are later used to convert the device-biased image data to device-specific image data, such as by clipping the device-biased image data to in-gamut device-specific image data using, for example, a one-dimensional look-up table for each color component. Additionally, the conversion from image data to device-biased image data may be reversed so that the device-biased image data is converted into the original image data. Thus, it is possible with the present invention to obtain the original image data and still allow for fast processing of the device-biased image data into device-specific image data used to output the image.

Figure 8:
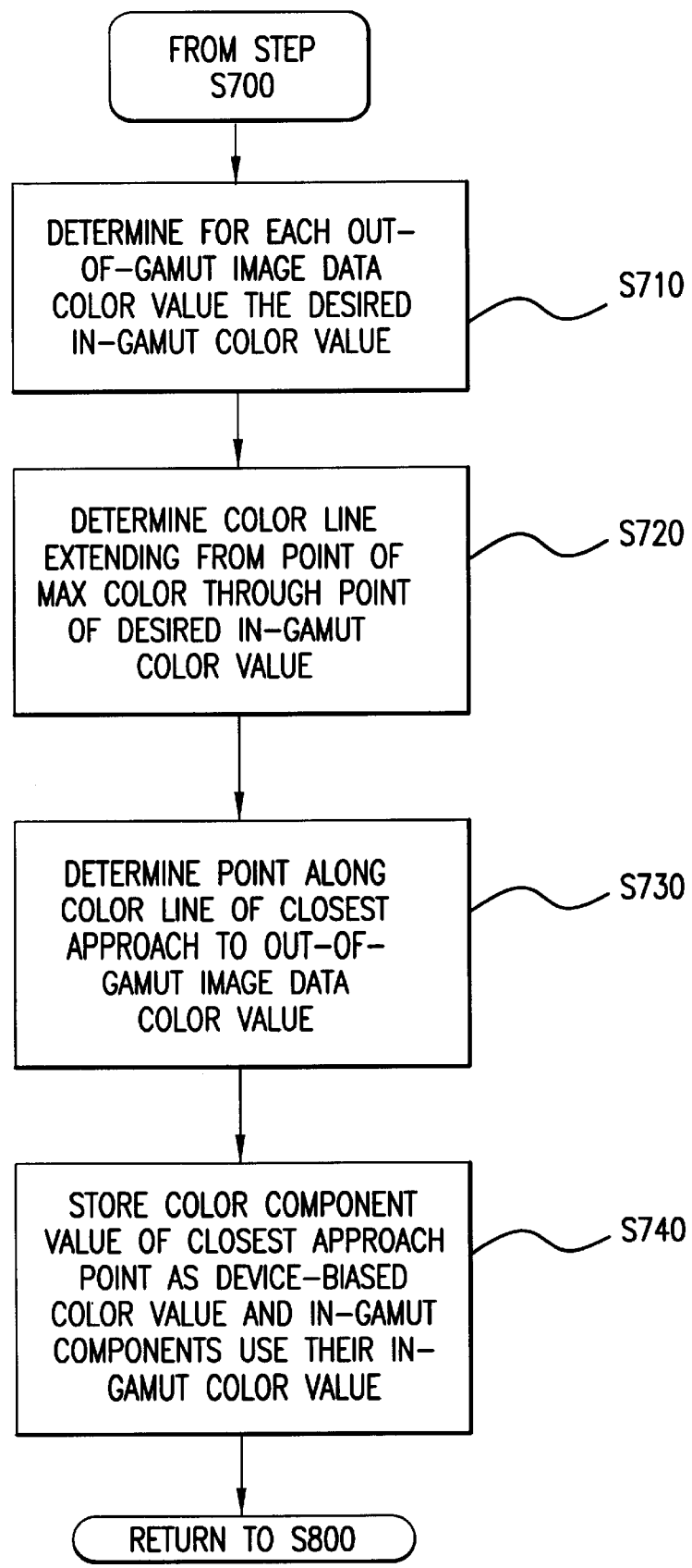
FIG. 8 is an exemplary flowchart outlining a second exemplary embodiment of the device-independent to device-biased image data conversion step according to this invention.

FIG. 8 is a flowchart outlining a second exemplary embodiment of the image data to device-biased image data conversion step S700 of FIG. 6. Starting in step S700, control continues to step S710, where the desired in-gamut color values for the out-of-gamut image data color values are determined. Then, in step S720, a color line extending from the point of maximum color, for example black (or white, as appropriate for the location of the mapped color), through the point of the desired in-gamut color values is determined. The color line may be, for example, the line L represented in FIG. 5. Next, in step S730, the point along the color line of closest approach to the out-of-gamut image data color value is determined. Control then continues to step S740.

In step S740, the point of closest approach is chosen as the device-biased color component value for the original image data color value. In-gamut components use their in-gamut values. Then, in step S750, control returns to step S800.

Figure 9:
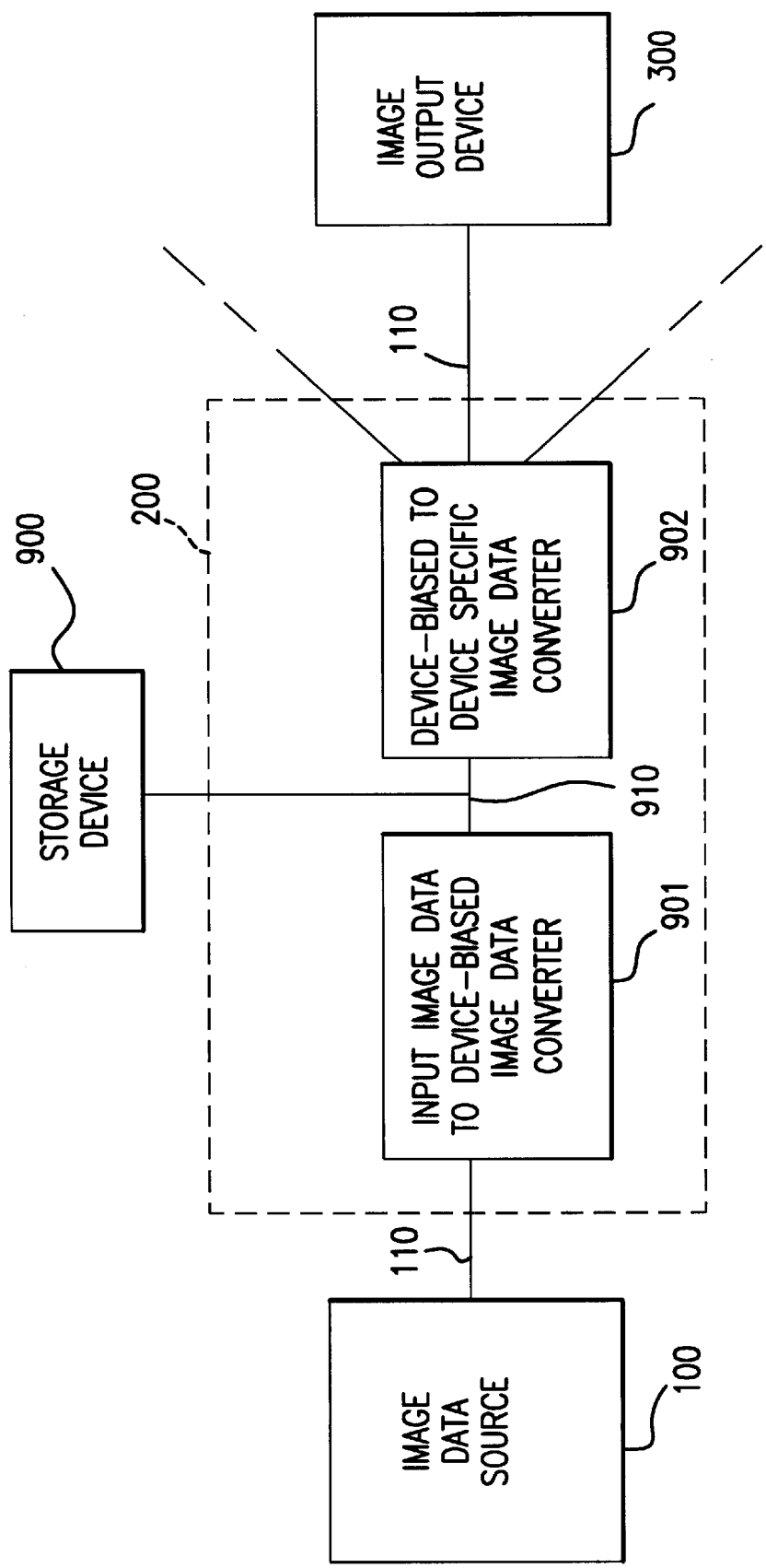
FIG. 9 is a functional block diagram of another exemplary embodiment of an image output system according to this invention.

FIG. 9 shows an alternative embodiment of the present invention in which the device biased image data converter 200 may be partitioned into an input image data to device-biased image data converter 901, performing functions similar to element 240 in FIG. 2, located near the image data source 100 and a device-biased to device-specific image data converter 902, performing functions similar to element 260 in FIG. 2, located at or near the image output device 300. With such a configuration, the input image data to device-biased image data converter 901 converts input image data into device-biased image data and stores the device-biased image data in a storage device 900 for later use. Whenever the image is to be reproduced by the image output device 300, the device biased image data is retrieved from storage device 900 and provided as the device-biased image data for the image to the device-biased to device-specific image data converter 902 for conversion into device-specific image data useable by the image output device 300.

Figure 10:
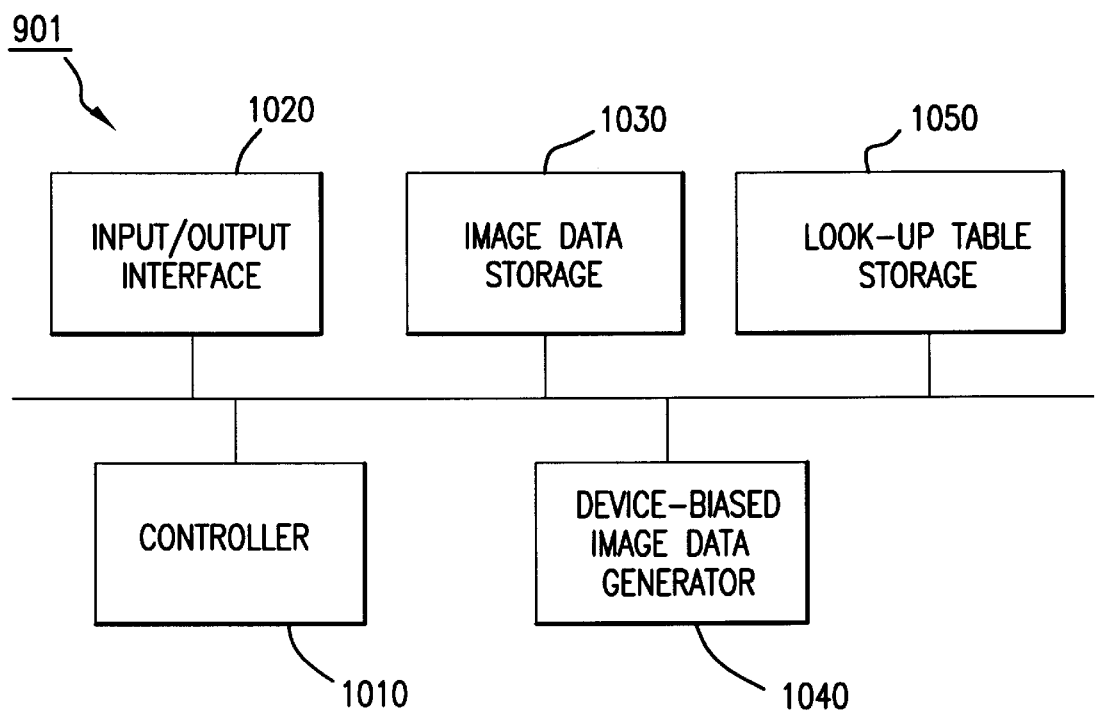
FIG. 10 is an exemplary functional block diagram of the input image data to device-biased image data converter of FIG. 9.
Figure 11:
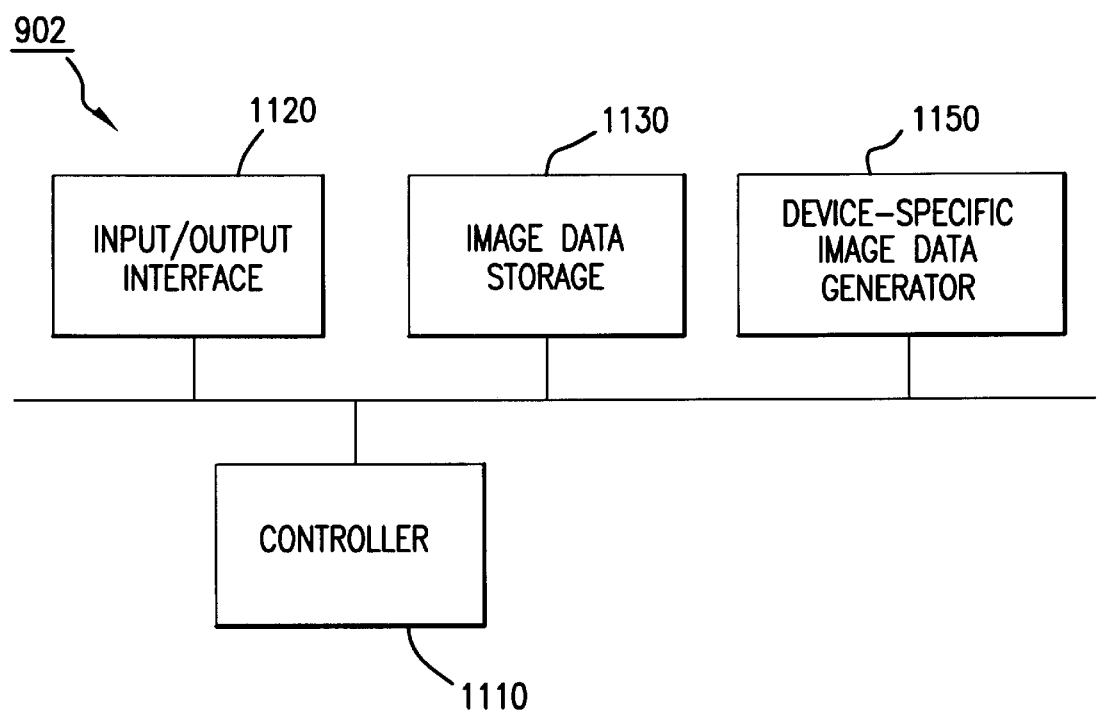
FIG. 11 is an exemplary functional block diagram of the device-biased to device-specific image data converter of FIG. 9.

FIGS. 10 and 11 show exemplary block diagrams of the input image data to device-biased image data converter 901 and the device-biased to device-specific image data converter 902, respectively. As shown in FIG. 10, the input image data to device-biased image data converter 901 includes its own controller 1010, input/output device 1020, image data storage 1030, a device-biased image data generator 1040, and a look-up table storage 1050. As shown in FIG. 11, the device-biased to device-specific image data converter 902 includes its own controller 1110, input/output device 1120, image data storage 1130, and device-specific image data generator 1150.

Image data is sent from the image data source 100 to the input image data to device-biased image data converter 901. The input image data to device-biased image data converter 901 receives the image data through the input/output device 1020 and stores the image data in the image data storage 1030. The controller 1010 then instructs the device-biased image data generator 1040 to convert the image data into device-biased image data, using the look-up tables in the look-up table storage 1050, and to store the device-biased image data in the image data storage 1030. The controller 1010 then sends the device-biased image data to the storage device 900 via the input/output interface 1020.

When the image is to be output by the image output device 300, the stored device-biased image data is output to the device-biased to device-specific image data converter 902 via the input/output interface 1120. The device-biased to device-specific image data converter 902 receives the device-biased image data via the input/output interface 1120 and stores it in the image data storage 1130. The controller 1110 then instructs the device-specific image data generator 1150 to convert the device-biased image data into device-specific image data using simple clipping or one dimensional look-up tables on the color components. The device-specific image data is then sent to the image output device 300 via the input/output interface 1120.

With the above described exemplary embodiments, the apparatus and methods according to this invention convert image data into device-biased image data that may be easily converted into device-specific image data without requiring large amounts of processing time and storage space. Because the image data is stored as device-biased image data and not device-specific image data, the original image data may be recovered by reversing the conversion from image data to device-biased image data.

As shown in FIGS. 1, 2, 10 and 11, the device-biased image data converter 200 may be implemented on a general purpose or special purpose computer. However, the device-biased image data converter 200 can also be implemented on a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 6-8 can be used to implement the device-biased image data converter 200 of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for producing an image usable to print image data that is in a first color space on an output device, comprising:
   receiving image data in a second color space that is different than the first color space;
   converting the image data in the second color space into device-biased image data in the first color space;
   converting the device-biased image data in the first color space into device-specific image data in the first color space; and
   using the device-specific image data in the first color space to output the image.

2. The method of claim 1, wherein the device-specific image data in the first color space is at least one of RGB color space image data or CMYK color space image data.

3. The method of claim 1, wherein the step of converting image data to device-biased image data includes mapping the image data to device-specific image data regardless of the gamut of an image output device to which the device-specific image data is to be sent.

4. The method of claim 3, wherein the step of mapping the image data to device-specific image data regardless of the gamut of an image output device further includes mapping in-gamut image data to in-gamut device-specific image data and mapping out-of-gamut image data to out-of-gamut device-specific image data.

5. The method of claim 3, wherein the step of converting the device-biased image data to device-specific image data includes mapping in-gamut device-biased image data and out-of-gamut device-biased image data to in-gamut device-specific image data.

6. The method of claim 3, wherein the step of converting the device-biased image data to device-specific image data includes clipping out-of-gamut device-biased image data to in-gamut device-specific image data.

7. The method of claim 1, wherein the step of converting the image data to device-biased image data further comprises:
   determining for out-of-gamut image data of the received image data, desired device-specific image data to which the out-of-gamut image data should be mapped for outputting the image; and
   assigning out-of-gamut device-biased image data values to the out-of-gamut image data such that, in response to the out-of-gamut device-biased image data values being clipped or mapped to the gamut of an image output device, the desired device-specific image data is obtained.

8. The method of claim 7, wherein the out-of-gamut device-biased image data values assigned to the out-of-gamut image data are assigned such that:
   at least one of a plurality of color components of the out-of-gamut device-biased image data values is outside a gamut of an image output device to which the desired device-specific image data is to be output;
   if a color component of the out-of-gamut device-biased image data values is to be clipped to zero, the out-of-gamut device-biased image data value is assigned a negative value; and
   each one of the out-of-gamut device-biased image data values is unique.

9. The method of claim 7, wherein the out-of-gamut device-biased image data values assigned to the out-of-gamut image data are chosen arbitrarily.

10. The method of claim 7, wherein the step of assigning out-of-gamut device-biased image data values to the out-of-gamut image data further comprises:
    determining a color line extending from a point of lightest or darkest color through a point representing a desired device-specific image data value;
    determining a point along the color line that is a point of closest approach to a point representing an out-of-gamut image data value; and
    assigning the point of closest approach as an out-of-gamut device-biased image data value for an out-of-gamut component.

11. A device-biased image data converter, comprising:
    an image data memory that stores input image data, the input image data being in a second color space;
    an input image data to device-biased image data converter that converts the storage input image data in the second color space into device-biased image data that is in a first color space that is different than the second color space; and
    a device-biased image data to device-specific image data converter that converts the device-biased image data in the first color space into device-specific image data that is in the first color space.

12. The device-biased image data converter of claim 11, wherein the input image data to device-biased image data converter converts the input image data that is in the second color space into device-biased image data in the firs color space and stores the device-biased image data in the image data memory; and
    the device-biased image data to device-specific image data converter converts the device-biased image data in the first color space to device-specific image data in the first color space and outputs the device-specific image data to at least one image output device.

13. The device-biased image data converter of claim 12, wherein the device-specific image data in the first color space is at least one of RGB color space image data or CMYK color space image data.

14. The device-biased image data converter of claim 12, wherein the input image data to device-biased image data converter converts input image data to device-biased image data by mapping the input image data to a device-specific image data space regardless of the gamut of an image output device to which the device-specific image data is to be sent.

15. The device-biased image data converter of claim 14, wherein the device-neutral image data in the second color space is L*a*b* color space image data.

16. The device-biased image data converter of claim 12, wherein the input image data to device-biased image data converter maps the input image data to device-biased image data by mapping in-gamut input image data to in-gamut device-specific image data and mapping out-of-gamut input image data to out-of-gamut device-biased image data, and stores the in-gamut device-specific image data and out-of-gamut device-biased image data in the image data memory as device-biased image data.

17. The device-biased image data converter of claim 12, wherein the device-biased image data to device-specific image data converter converts device-biased image data to device-specific image data by mapping in-gamut device-biased image data and out-of-gamut device-biased image data to in-gamut device-specific image data.

18. The device-biased image data converter of claim 12, wherein the device-biased image data to device-specific image data converter converts device-biased image data to device-specific image data by clipping out-of-gamut device-biased image data to in-gamut device-specific image data.

19. The device-biased image data converter of claim 12, wherein the input image data to device-biased image data converter converts the input image data to device-biased image data by:

determining, for out-of-gamut image data of the received image data, desired device-specific image data to which the out-of-gamut image data should be mapped for outputting the image; and assigning out-of-gamut device-biased image data values to the out-of-gamut image data such that, in response to the out-of-gamut device-biased image data values being clipped or mapped to the gamut of an image output device, the desired device-specific image data is obtained.

20. The device-biased image data converter of claim 19, wherein the out-of-gamut device-biased image data values assigned to the out-of-gamut image data are assigned such that:

at least one of a plurality of color components of the out-of-gamut device-biased image data values is outside a gamut of an image output device to which the desired device-specific image data is to be output;

if a color component of the out-of-gamut device-biased image data values is to be clipped to zero, the out-of-gamut device-biased image data value is assigned a negative value; and each one of the out-of-gamut device-biased image data values is unique.

21. The device-biased image data converter of claim 12, wherein the out-of-gamut device-biased image data values assigned to the out-of-gamut input image data are chosen arbitrarily.

22. The device-biased image data converter of claim 12, wherein the input image data to device-biased image data converter converts the input image data to device-biased image data by:

determining a color line extending from a point of lightest or darkest color through a point representing a desired device-specific image data value;

determining a point along the color line that is a point of closest approach to a point representing an out-of-gamut image data value; and assigning the point of closest approach as an out-of-gamut device-biased image data value for an out-of-gamut component.

23. The device-biased image data converter of claim 11, wherein the input image data is device-neutral image data.

24. A method for producing an image on an output device usable to print image data in a first color space, comprising:

receiving device-neutral image data in a device-neutral color space that is different than the first color space;

converting the device-neutral image data into device-biased image data in the first color space;

converting the device-biased image data in the first color space into device-specific image data in the first color space; and using the device-specific image data in the first color space to output the image.

25. The method of claim 24, wherein the device-neutral image data in the second color space is L*a*b* color space image data.

* * * * *